United States Patent
Dry et al.

(10) Patent No.: US 6,939,391 B2
(45) Date of Patent: *Sep. 6, 2005

(54) DIRECT SMELTING PROCESS AND APPARATUS

(75) Inventors: Rodney J. Dry, City Beach (AU); Peter Burke, Winthrop (AU)

(73) Assignee: Technological Resources Pty Ltd, Melbourne (AU)

( * ) Notice: Subject to any disclaimer, the term of this patent is extended or adjusted under 35 U.S.C. 154(b) by 45 days.

This patent is subject to a terminal disclaimer.

(21) Appl. No.: 10/220,049

(22) PCT Filed: Mar. 2, 2001

(86) PCT No.: PCT/AU01/00222

§ 371 (c)(1), (2), (4) Date: Jan. 27, 2003

(87) PCT Pub. No.: WO01/64960

PCT Pub. Date: Sep. 7, 2001

(65) Prior Publication Data

US 2003/0164066 A1 Sep. 4, 2003

(30) Foreign Application Priority Data

Mar. 3, 2000 (AU) .......................................... PQ 5994

(51) Int. Cl.$^7$ .............................................. C21B 11/00
(52) U.S. Cl. ............................. 75/501; 75/502; 75/532; 266/225
(58) Field of Search .................... 75/501, 502, 532; 266/225

(56) References Cited

U.S. PATENT DOCUMENTS

| 5,489,325 A | 2/1996 | Keogh et al. | |
| 6,626,977 B1 * | 9/2003 | Dry | 75/502 |

FOREIGN PATENT DOCUMENTS

| EP | 0 328 677 A | 8/1989 |
| EP | 0 743 368 A | 11/1996 |
| EP | 0 290 650 A | 11/1998 |
| WO | WO 96/31627 | 10/1996 |
| WO | WO 00 01855 A | 1/2000 |
| WO | WO 00 14285 A | 3/2000 |

* cited by examiner

Primary Examiner—Melvyn Andrews
(74) Attorney, Agent, or Firm—Miles & Stockbridge P.C.; Edward J. Kondracki (57) ABSTRACT

A molten bath-based direct smelting process for producing ferrous metal from a ferrous feed material is disclosed. The process is characterised by injecting pro-heated air downwardly into metallurgical vessel at an angle of 20 to 90° C. relative to a horizontal axis and at a temperature of 800–1400 ° C. and at a velocity of 200–600 m/s via at least one lance (27). This step forces molten material in the region of a lower end of the lance away from the lance and forming a "free" space around the lower end of the lance that has a concentration of molten material that is lower than the molten material concentration in the raised bath. The process is further characterised in that the lance is located so that: (i) the lance extends into the vessel a distance that is at least the outer diameter of he lover end of the lance; and (ii) the lower end of the lance is at least 3 times the outer diameter of the lower end of the lance above a quiescent surface of the molt bath.

17 Claims, 6 Drawing Sheets

DIRECT SMELTING PROCESS AND APPARATUS

BACKGROUND OF THE INVENTION

1. Field of the Invention

The present invention relates to a molten bath-based direct smelting process and an apparatus for producing molten ferrous metal (which term includes ferroalloys), in particular although by no means exclusively iron, from ferrous feed material, such as ores, partly reduced ores and metal-containing waste streams which uses a pre-heated air-based (which term includes oxygen enriched air up to 50% $O_2$) system for post combusting reaction gases (principally being CO and $H_2$) that are generated in the molten bath.

2. Description of Related Art

Without adequate post combustion of reaction gases and subsequent substantial transfer of heat back to the molten bath, such bath based direct smelting processes, particularly those without a pre-reduction stage, become uneconomic and in many cases unworkable because of the endothermic nature of the reduction of ferrous feed materials. While oxygen based post combustion systems (which term includes impure $O_2$ down to 50% $O_2$) as against pre-heated air based systems have advantages such as the minimisation of off gas volumes there is also a significant cost in supplying large amounts of oxygen.

A further requirement is that good post combustion must not be at the expense of re-oxiding significant amounts of molten ferrous metal in the molten bath as the process becomes inefficient, with excessive amounts of solid carbonaceous material being needed to counter such oxidation. As well, excessively high amounts of liquid $FeO_x$ (principally FeO) in the molten bath is particularly detrimental to refractory wear in the region between the nominal quiescent surface level of the molten ferrous metal and that of the bath as a whole.

One known molten bath-based direct smelting process for producing molten ferrous metal is the DIOS process. The DIOS process includes a pre-reduction stage and a smelt reduction stage. In the DIOS process ore (−8 mm) is pre-heated (750° C.) and pre-reduced (10 to 30%) in fluidised beds using offgas from a smelt reduction vessel which contains a molten bath of metal and slag, with the slag forming a deep layer on the metal. The fine (−3 mm) and coarse (−8 mm) components of the ore are separated in the pre-reduction stage of the process. Coal and pre-heated and pre-reduced ore (via two feed lines) are fed continuously into the smelt reduction furnace from the top of the furnace. The ore dissolves and forms FeO in the deep layer of slag and the coal decomposes into char and volatile matter in the slag layer. Oxygen is blown through a specially designed lance that improves secondary combustion in the foamed slag. Oxygen jets burn carbon monoxide that is generated with the smelting reduction reactions, thereby generating heat that is transferred to the molten slag. The FeO is reduced at the slag/metal and slag/char interfaces. Stirring gas introduced into the hot metal bath from the bottom of the smelt reduction vessel improves heat transfer efficiency and increases the slag/metal interface for reduction. Slag and metal are tapped periodically.

Another known direct smelting process for producing molten ferrous metal is the AISI process. The AISI process also includes a pre-reduction stage and a smelt reduction stage. In the AISI process pre-heated and partially pre-reduced iron ore pellets, coal or coke breeze and fluxes are top charged into a pressurised smelt reactor which contains a molten bath of metal and slag. The coal devolatilises in the slag layer and the iron ore pellets dissolve in the slag and then are reduced by carbon (char) in the slag. High gas generation rates result in slag foaming. Carbon monoxide and hydrogen generated in the process are post combusted in or just above the slag layer to provide the energy required for the endothermic reduction reactions. Oxygen is top blown through a central, water cooled lance and nitrogen is injected through tuyeres at the bottom of the reactor to ensure sufficient stirring to facilitate heat transfer of the post combustion energy to the bath. The process offgas is de-dusted in a hot cyclone before being fed to a shaft type furnace for pre-heating and pre-reduction of the pellets to FeO or wustite.

Another known direct smelting process for producing molten ferrous metal is the HIsmelt process. One form of the HIsmelt process as described in International application PCT/AU96/00197 (WO 96/31627) in the name of the applicant, comprises:

(a) forming a molten bath of metal and slag in a vessel;
(b) injecting into the bath:
   (i) ferrous feed material, typically metal oxides; and
   (ii) a solid carbonaceous material, typically coal, which acts as a reductant of the metal oxides and a source of energy; and
(c) smelting the ferrous feed material to metal in the metal layer of the molten bath.

The HIsmelt process also comprises injecting oxygen-containing gas into a space above the bath and post-combusting reaction gases, such as CO and $H_2$, released from the bath and transferring the heat generated to the bath to contribute to the thermal energy required to smelt the metalliferous feed materials.

SUMMARY OF THE INVENTION

The applicant has carried out extensive pilot plant work and computational fluid dynamics modelling work on the HIsmelt process and has made a series of significant findings in relation to pre-heated air based systems.

In general terms, the present invention provides a direct smelting process for producing ferrous metal from a ferrous feed material which includes the steps of:

(a) forming a bath of molten metal and molten slag in a metallurgical vessel;
(b) injecting ferrous feed material into the molten bath and smelting the ferrous feed material to metal in the molten bath;
(c) injecting solid carbonaceous material into the molten bath;
(d) generating a gas flow in the molten bath at least in part by reactions of injected material in the bath which carries molten material upwardly above a quiescent surface of the molten bath to form a raised bath;
(e) injecting pre-heated air into the vessel such that it impinges on or penetrates the raised bath and post-combusts reaction gases released from or contained within the raised bath, and thereby facilitating heat transfer to the molten bath;

which process is characterised by injecting pre-heated air downwardly into the vessel at an angle of 20 to 90° C. relative to a horizontal axis and at a temperature of 800–1400° C. and at a velocity of 200–600 m/s via at least one lance and forcing molten material in the raised bath in the region of a lower end of the lance away from the lance and forming a "free" space around the lower end of the lance that has a concentration of molten material that is lower than the molten material concentration in the raised bath, the lance being located so that: (i) the lance extends into the vessel a distance that is at least the outer diameter of the lower end of the lance; and (ii) the lower end of the lance is at least 3 times the outer diameter of the lower end of the lance above the quiescent surface of the molten bath.

Preferably the concentration of molten material in the free space around the lower end of the lance is 5% or less by volume of the space.

Preferably the free space around the lower end of the lance is a semi-spherical volume that has a diameter that is at least 2 times the outer diameter of the lower end of the lance.

Preferably the diameter of the free space around the lower end of the lance is no more than 4 times the outer diameter of the lower end of the lance.

Preferably at least 50%, more preferably at least 60%, by volume of the oxygen in the pre-heated air is combusted in the free space around the lower end of the lance.

Preferably the process includes injecting pre-heated air into the vessel in a swirling motion.

The term "smelting" is understood herein to mean thermal processing wherein chemical reactions that reduce the ferrous feed material take place to produce liquid metal.

The term "quiescent surface" is understood to mean a surface of the molten bath referred to under process conditions in which there is no gas/solids injection and therefore no bath agitation.

As indicated above, the term "air" is understood herein to mean air or oxygen-enriched air which contains up to 50% by volume $O_2$.

Preferably the superficial gas flow in the molten bath is at least 0.04 $Nm^3/s/m^2$ of the quiescent surface of the molten bath.

Preferably the superficial gas flow rate is at least 0.2 $Nm^3/s/m^2$ of the quiescent surface of the molten bath.

Preferably the superficial gas flow rate is less than 2 $Nm^3/s/m^2$ of the quiescent surface of the molten bath.

The gas flow in the molten bath may be caused by any one or more of a number of factors. For example, gas flow may be generated at least in part as a result of injection of ferrous feed material and solid carbonaceous material into the molten bath, preferably into a lower region of the molten bath. By way of further example, gas flow may be generated at least in part as a result of injection of carrier gas into the molten bath, preferably, the lower region of the molten bath, with injected ferrous feed material and/or solid carbonaceous material. By way of further example, gas flow may be generated at least in part as a result of bottom and/or side wall injection of a gas into the molten bath, preferably the lower region of the molten bath.

Preferably the process includes controlling the level of dissolved carbon in molten iron to be at least 3 wt % and maintaining the slag in a strongly reducing condition leading to FeO levels of less than 6 wt %, more preferably less than 5 wt %, in the slag.

Preferably the process includes maintaining a high slag inventory in the vessel relative to the molten ferrous metal in the vessel.

The amount of slag in the vessel, ie the slag inventory, has a direct impact on the amount of slag that is in an upper region of the molten bath.

The relatively low heat transfer characteristics of slag compared to metal is important in the context of minimising heat loss to water cooled side walls and from the vessel via the side walls of the vessel.

By appropriate process control, slag can form a layer or layers on the side walls that adds resistance to heat loss from the side walls.

Therefore, by changing the slag inventory it is possible to increase or decrease the amount of slag on the side walls and therefore control the heat loss via the side walls of the vessel.

The slag may form a "wet" layer or a "dry" layer on the side walls. A "wet" layer comprises a frozen layer that adheres to the side walls, a semi-solid (mush) layer, and an outer liquid film. A "dry" layer is one in which substantially all of the slag is frozen.

The amount of slag in the vessel also provides a measure of control over the extent of post combustion.

Specifically, if the slag inventory is too low there will be increased exposure of metal and therefore increased oxidation of metal and dissolved carbon in metal and the potential for reduced post-combustion and consequential decreased post combustion, notwithstanding the positive effect that metal has on heat transfer to the metal layer.

In addition, if the slag inventory is too high the one or more than one pre-heated air injection lance will be buried in the molten bath and this minimises movement of top space reaction gases to the end of the or each lance and, as a consequence, reduces potential for post-combustion.

The amount of slag in the vessel, ie the slag inventory, may be controlled by the tapping rates of metal and slag.

The production of slag in the vessel may be controlled by varying the feed rates of ferrous feed material, carbonaceous material, and fluxes to the vessel and operating parameters such as oxygen-containing gas injection rates.

Preferably the process includes injecting ferrous material and carbonaceous material, which acts as a source of reductant and as a source of energy, into the lower region of the molten bath.

One option is to inject ferrous material and carbonaceous material via lances/tuyeres extending downwardly into the molten bath. Typically, the lances/tuyeres extend through side walls of the vessel and are angled inwardly and downwardly within the molten bath.

Another option, although by no means not the only other option, is to inject ferrous material and carbonaceous material via tuyeres in the bottom of the vessel or in side walls of the vessel that contact the molten bath.

The injection of ferrous material and carbonaceous material may be through the same or separate lances/tuyeres.

Preferably the level of post-combustion is at least 40%, where post-combustion is defined as:

$$\frac{[CO_2] + [H_2O]}{[CO_2] + [H_2O] + [CO] + [H_2]}$$

where:
  [$CO_2$]=volume % of $CO_2$ in off-gas
  [$H_2O$]=volume % of $H_2O$ in off-gas
  [CO]=volume % of CO in off-gas
  [$H_2$]=volume % of $H_2$ in off-gas According to the present invention there is also provided an apparatus for producing ferrous metal from a ferrous feed material by a direct smelting process, which apparatus includes a vessel that contains a bath of molten metal and molten slag and a gas continuous space above the molten bath, which vessel includes:

(a) a hearth formed of refractory material having a base and sides in contact with a lower region of the molten bath;

(b) side walls extending upwardly from the sides of the hearth and being in contact with an upper region of the molten bath and the gas continuous space, wherein the side walls that contact the gas continuous space include water cooled panels and a layer of slag on the panels;

(c) a means of supplying ferrous feed material and carbonaceous material into the vessel;

(d) a means of generating a gas flow in the molten bath which carries molten material upwardly above a nominal quiescent surface of the molten bath and forms a raised bath;

(e) at least one lance extending downwardly into the vessel and injecting pre-heated air into the vessel at an angle of 20 to 90° relative to a horizontal axis at a velocity of 200–600 m/s and at a temperature of 800–1400° C., the lance being located so that:

(i) the lance extends into the vessel a distance that is at least the outer diameter of a lower end of the lance; and (ii) the lower end of the lance is at least 3 times the outer diameter of the lower end of the lance above a quiescent surface of the molten bath;

the air impinging on or penetrating the raised bath and post-combusting reaction gases released from or contained within the raised bath, and the injection of air forcing molten material in the raised bath in the region of the lower end of the lance away from the lower end so that there is a "free" space around the lower end of the lance that has a concentration of molten material lower than that in the raised bath; and (f) a means for tapping molten metal and slag from the vessel.

Preferably the supply means/gas generating means includes a plurality of lances/tuyeres injecting ferrous feed material and carbonaceous material with a carrier gas into the molten bath and generating the gas flow.

BRIEF DESCRIPTION DRAWINGS

The present invention is described further by way of example with reference to the accompanying drawings of which.

DETAILED DESCRIPTION OF THE PREFERRED EMBODIMENTS

The following description is in the context of smelting iron ore to produce molten iron and it is understood that the present invention is not limited to this application and is applicable to any suitable ferrous ores and/or concentrates—including partially reduced ferrous ores and waste revert materials.

Figure 1:
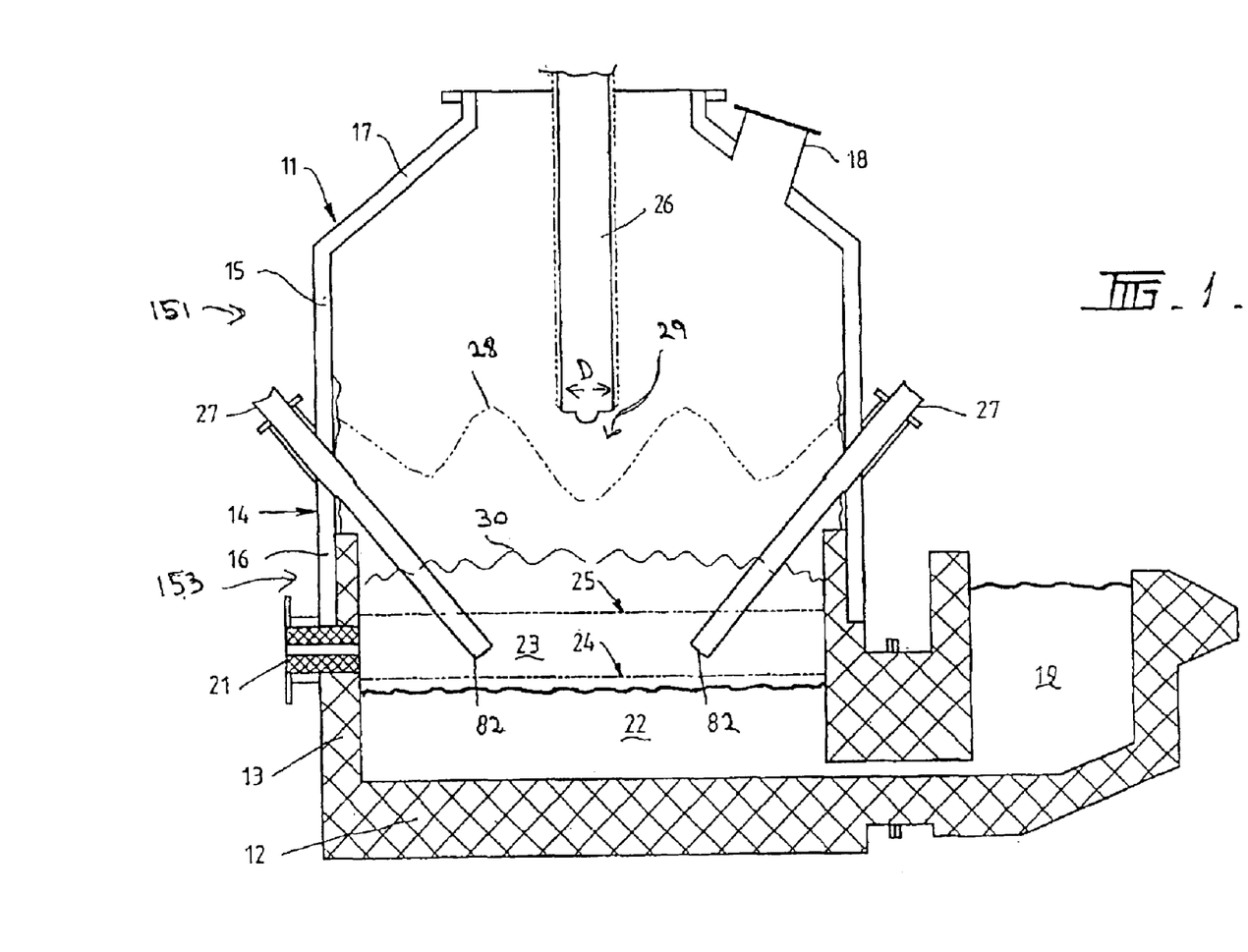
FIG. 1 is a vertical section illustrating in schematic form a preferred embodiment of the process and the apparatus of the present invention.

The direct smelting apparatus shown in FIG. 1 includes a metallurgical vessel denoted generally as 11. The vessel 11 has a hearth that includes a base 12 and sides 13 formed from refractory bricks; side walls 14 which form a generally cylindrical barrel extending upwardly from the sides 13 of the hearth and which includes an upper barrel section 151 formed from water cooled panels and a lower barrel section 153 formed from water cooled panels having an inner lining of refractory bricks; a roof 17; an outlet 18 for off-gases; a forehearth 19 for discharging molten metal continuously; and a tap-hole 21 for discharging molten slag.

In use, the vessel contains a molten bath of iron and slag which, under quiescent conditions, includes a layer 22 of molten metal and a layer 23 of molten slag on the metal layer 22. The term "metal layer" is understood herein to mean a region of the bath that is predominantly metal. The term "slag layer" is understood herein to mean a region of the bath that is predominantly slag. The arrow marked by the numeral 24 indicates the position of the nominal quiescent surface of the metal layer 22 and the arrow marked by the numeral 25 indicates the position of the nominal quiescent surface of the slag layer 23 (ie of the molten bath). The term "quiescent surface" is understood to mean the surface when there is no injection of gas and solids into the vessel.

The vessel is fitted with a downwardly extending hot air injection lance 26 for delivering a hot air blast into an upper region of the vessel and post-combusting reaction gases released from the molten bath. The lance 26 has an outer diameter D at a lower end of the lance. The lance 26 is located so that:

(i) a central axis of the lance 26 is at an angle of 20 to 90° relative to a horizontal axis so that the angle of injection of hot air is within this range;

(ii) the lance 26 extends into the vessel a distance that is at least the outer diameter D of the lower end of the lance; and (iii) the lower end of the lance 26 is at least 3 times the outer diameter D of the lower end of the lance above the quiescent surface 25 of the molten bath.

The lance 26 is described in more detail with reference to FIGS. 2–10.

The vessel is also fitted with solids injection lances 27 (two shown) extending downwardly and inwardly through the side walls 14 and into the molten bath for injecting iron ore, solid carbonaceous material, and fluxes entrained in an oxygen-deficient carrier gas into the molten bath. The position of the lances 27 is selected so that their outlet ends 82 are above the quiescent surface of the metal layer 22. This position of the lances reduces the risk of damage through contact with molten metal and also makes it possible to cool the lances by forced internal water cooling without significant risk of water coming into contact with the molten metal in the vessel.

In use, iron ore, solid carbonaceous material (typically coal), and fluxes (typically lime and magnesia) entrained in a carrier gas (typically $N_2$) are injected into the molten bath 15 via the lances 27. The momentum of the solid material/carrier gas causes the solid material and gas to penetrate to a lower region of the molten bath. The coal is devolatilised and thereby produces gas in the lower bath region. Carbon partially dissolves into the metal and partially remains as solid carbon. The iron ore is smelted to metal and the smelting reaction generates carbon monoxide gas. The gases transported into the lower bath region and generated via devolatilisation and smelting produce significant buoyancy uplift of molten metal, solid carbon, and slag (drawn into the lower bath region as a consequence of solid/gas/injection) from the lower bath region which generates an upward movement of splashes, droplets and streams of molten metal and slag, and these splashes, and droplets, and streams entrain slag as they move through an upper region of the molten bath. The gas flow generated by the above-described injection of carrier gas and bath reactions is at least 0.4 $Nm^3/s/m^2$ of the quiescent surface of the molten bath (i.e. the surface 25).

The buoyancy uplift of molten metal, solid carbon and slag causes substantial agitation in the molten bath, with the result that the molten bath 23 expands in volume and has a surface indicated by the arrow 30. The extent of agitation is such that there is reasonably uniform temperature throughout the molten bath—typically, 1450–1550° C.

In addition, the upward movement of splashes, droplets and streams of molten material caused by the buoyancy uplift of molten metal, solid carbon, and slag extends into the top space 31 above the molten bath in the vessel and:
(a) forms a transition zone 28; and
(b) projects some molten material (predominantly slag) beyond the transition zone 28 and onto the part of the upper barrel section 151 of the side walls 14 that is above the transition zone 28 and onto the roof 17.

The expanded molten bath and the transition zone 28 define a raised bath.

In addition to the above, in use, hot air at a temperature of 800–1400° C. is discharged at a velocity of 200–600 m/s via lance 26 and penetrates the central region of the transition zone 28 and causes an essentially metal/slag free space 29 to form around the end of the lance 26.

The hot air blast via the lance 26 post-combusts reaction gases CO and $H_2$ in the transition zone 28 and in the free space 29 around the end of the lance 26 and generates high temperatures of the order of 2000° C. or higher in the gas space. The heat is transferred to the ascending and descending splashes droplets, and streams, of molten material in the region of gas injection and the heat is then partially transferred throughout the molten bath.

The free space 29 is important to achieving high levels of post combustion because it enables entrainment of gases in the space above the transition zone 28 into the end region of the lance 26 and thereby increases exposure of available reaction gases to post combustion.

The combined effect of the position of the lance 26, gas flow rate through the lance 26, and upward movement of splashes, droplets and streams of molten material is to shape the transition zone 28 around the lower region of the lance 26. This shaped region provides a partial barrier to heat transfer by radiation to the side walls 14.

Moreover, the ascending and descending droplets, splashes and streams of material is an effective means of transferring heat from the transition zone 28 to the molten bath with the result that the temperature of the transition zone 28 in the region of the side walls 14 is of the order of 1450° C.–1550° C.

The construction of the hot air injection lance 26 is illustrated in FIGS. 2–9. As shown in these figures, lance 26 comprises an elongate duct 31 through which to pass the flow of hot air, which may be oxygen enriched. Duct 31 is comprised of a series of four concentric stainless steel tubes 32, 33, 34, 35 extending to a forward end part 36 of the duct where they are connected to a tip end piece 37. An elongate body part 38 is disposed centrally within the forward end part 36 of the duct and carries a series of four swirl imparting vanes 39. Central body part 38 is of elongate cylindrical formation with bull-nosed or domed forward and rear ends 41, 42. Vanes 39 are disposed in a four-start helical formation and are connected at their forward ends by radially outwardly extending vane ends 45 to the forward part of the duct.

Figure 2:
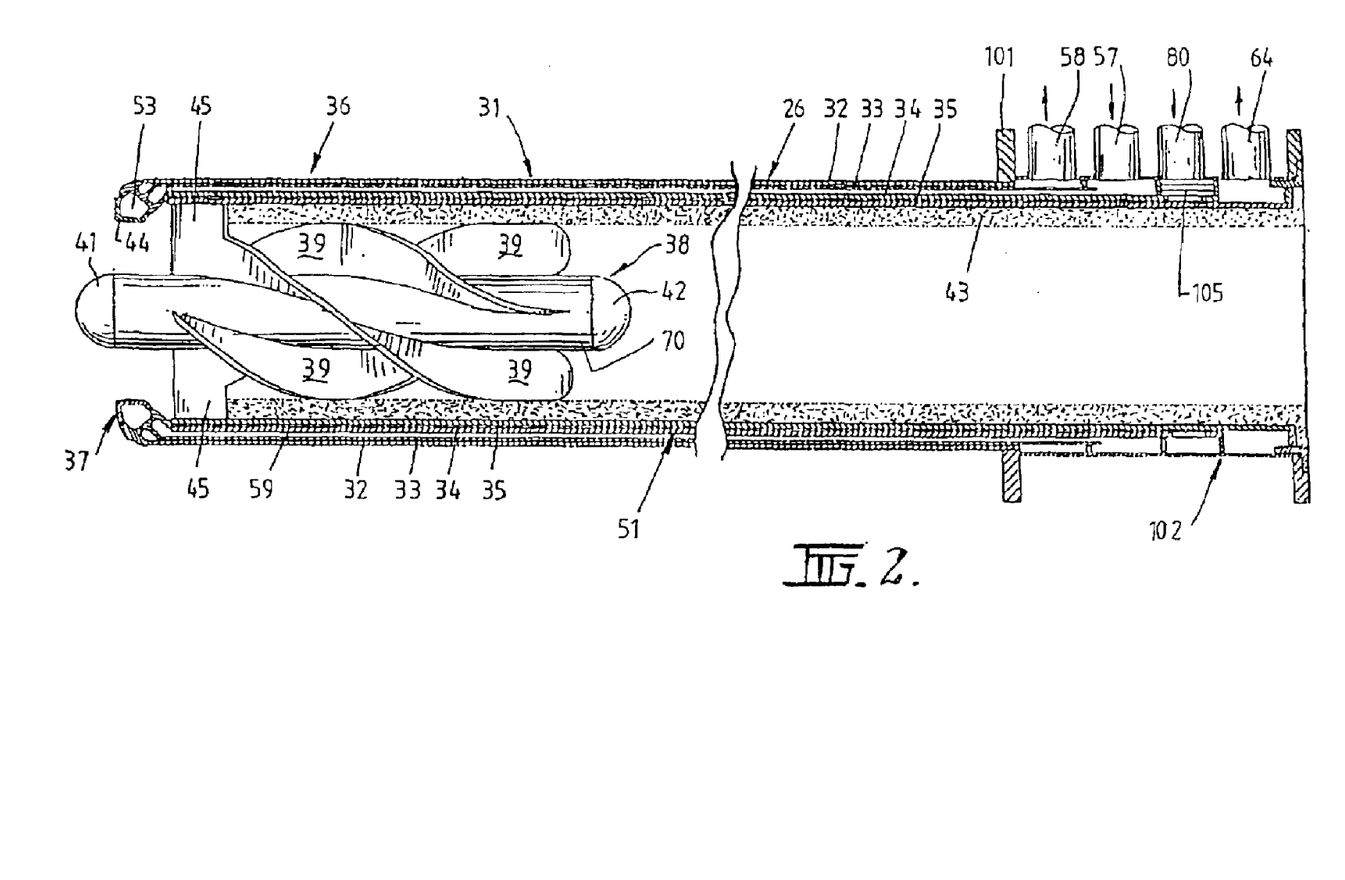
FIG. 2 is a longitudinal cross-section through the hot air injection lance shown in FIG. 1.
Figure 3:
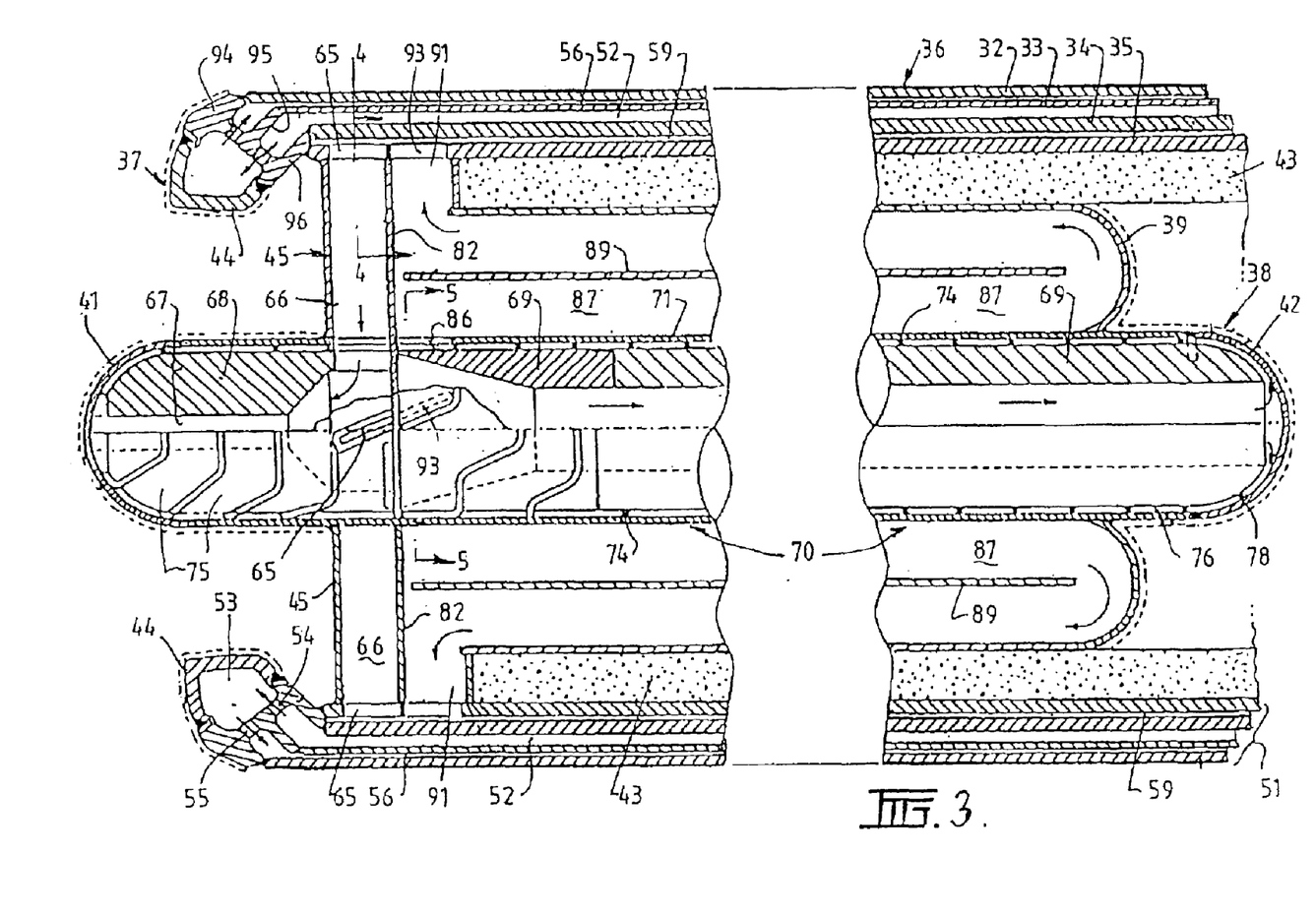
FIG. 3 is a longitudinal cross-section to an enlarged scale through a forward end part of the lance.
Figure 4:
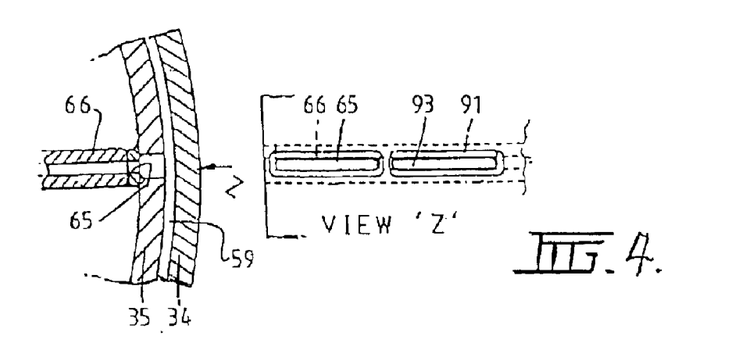
FIG. 4 is a cross-section on the line 4—4 in FIG. 3.
Figure 5:
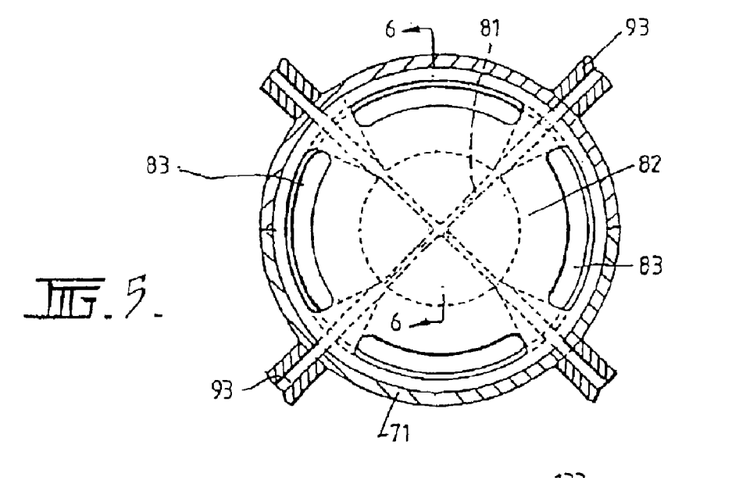
FIG. 5 is a cross-section on the line 5—5 in FIG. 3.
Figure 6:
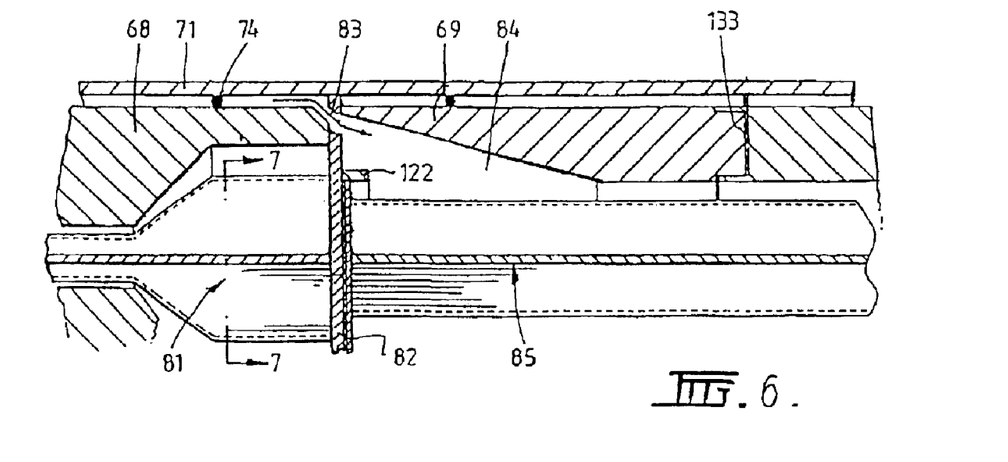
FIG. 6 is a cross-section on the line 6—6 in FIG. 5.
Figures 7, 8:
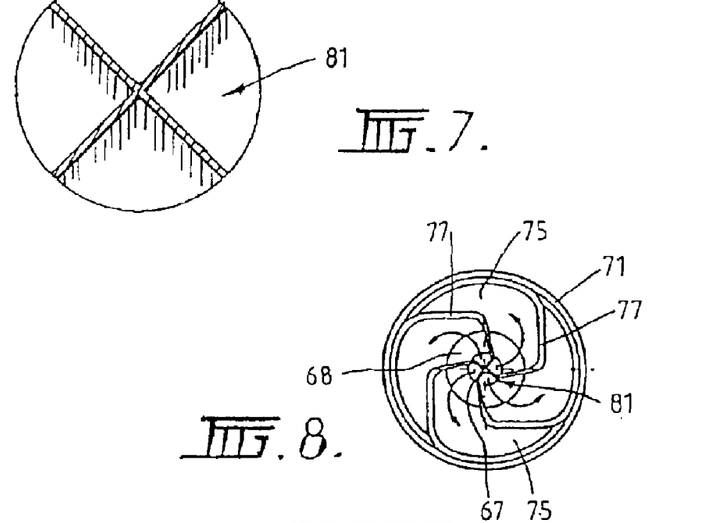
FIG. 7 is a cross-section on the line 7—7 in FIG. 6.
FIG. 8 illustrates water flow passages formed in a forward part of a central body disposed with the forward end of the lance.
Figure 9:
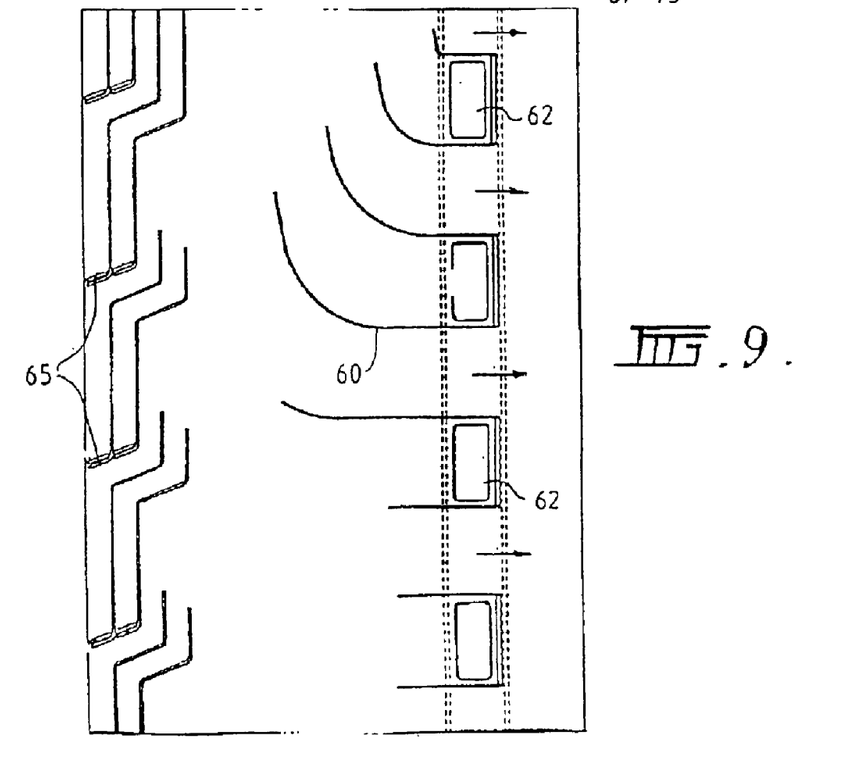
FIG. 9 is a development showing the arrangement of inlet and return water galleries for the central body part and four flow swirl vanes in the forward part of the lance.
Figure 10:
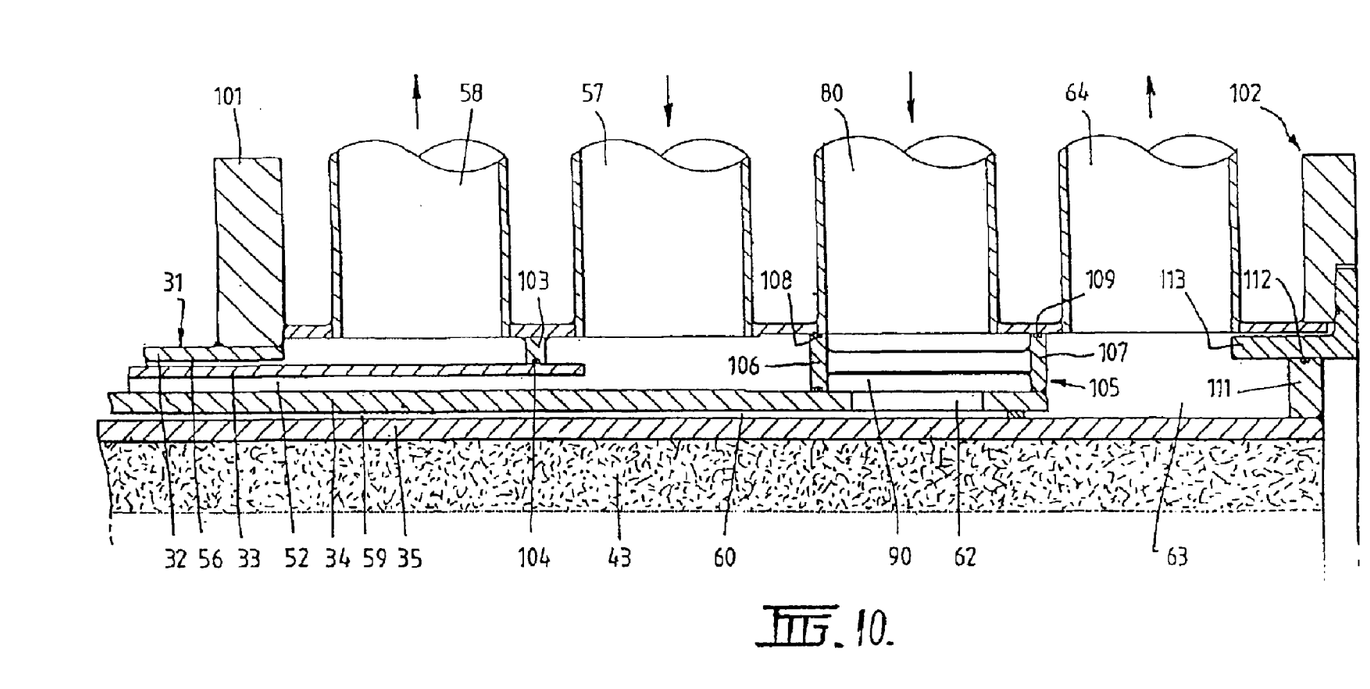
FIG. 10 is an enlarged cross-section through a rear part of the lance.

Duct 31 is internally lined throughout most of its length by an internal refractory lining 43 which fits within the innermost metal tube 35 of the duct and extends through to the forward end parts 42 of the vanes, the vanes 39 fitting neatly within the refractory lining behind these forward end parts 42.

The tip end piece 37 of the duct has a hollow annular head or tip formation 44 which projects forwardly from the remainder of the duct so as to be generally flush with the inner surface of the refractory lining 43 which defines the effective flow passage for gas through the duct. The forward end of central body part 38 projects forwardly beyond this tip formation 44 so that the forward end of the body part and the tip formation co-act together to form an annular nozzle from which the hot air blast emerges in an annular diverging flow with a strong rotational or swirling motion imparted by the vanes 39.

In accordance with the present invention, duct tip formation 44, central body part 38 and vanes 39 are all internally water cooled with flows of cooling water provided by cooling water flow passage means denoted generally as 51 extending through the wall of the duct. Water flow passage means 51 comprises a water supply passage 52 defined by the annular space between the duct tubes 33, 34 to supply cooling water to the hollow interior 53 of duct tip formation 44 via circumferentially spaced openings 54 in tip end piece 37. Water is returned from the tip end piece through circumferentially spaced openings 55 into an annular water return flow passage 56 defined between the duct tubes 32 and 33 and also forming part of the water flow passage means 51. The hollow interior 52 of tip end piece 37 is thus continuously supplied with cooling water to act as an internal cooling passage. The cooling water for the lance tip is delivered into supply passage 52 through an water inlet 57 at the rear end of the lance and the returning water leaves the lance through an outlet 58 also at the rear end of the lance.

The annular space 59 between duct tubes 34 and 35 is divided by helically wound divider bars into eight separated helical passages extending from the rear end of the duct through to the forward end part 36 of the duct. Four of these passages are supplied independently with water through four circumferentially spaced water inlets 62 to provide for independent water supplies for the cooling of vanes 39 and body part 38. The other four passages serve as return flow passages which are connected to a common annular return manifold passage 63 and a single water outlet 64.

Vanes 39 are of hollow formation and the interiors are divided to form water inlet and outlet flow passages through which water flows to and from the central body part 38 which is also formed with water flow passages for internal water cooling. The forward end parts 45 of vanes 39 are connected to the forward end of innermost duct tube 35 about four water inlet slots 65 through which water flows from the four separately supplied water inlet flow passages into radially inwardly directed inlet passages 66 in the forward ends of the vanes. The cooling water then flows into the forward end of central body part 38.

Central body part 38 is comprised of forward and rear inner body parts 68, 69 housed within a casing 70 formed of a main cylindrical section 71 and domed front and rear end-pieces 41, 42 which are hard faced to resist abrasion by refractory grit or other particulate material carried by the hot gas flow. A clearance space 74 between the inner parts 68, 69 and the outer casing of the central body part is subdivided into two sets of peripheral water flow passages 75, 76 by means of divider ribs 77, 78 formed on the outer peripheral surfaces of the inner body parts 68, 69. The forward set of peripheral water flow channels 75 are arranged to fan out from the front end of the central body part in the manner shown in FIG. 8 and backwardly around the body. A flow guide insert 81 is located centrally within the inner body part 68 to extend through the water flow passage 67 and to divide that passage into four circumferentially spaced water flow passages which independently receive the incoming flows of water through the water inlet passages 66 in the forward ends of the vanes, so maintaining four independent water inlet flows through to the front end of the central body part. These separate water flows communicate with the four front peripheral water flow channels 75 through which water flows back around the forward end of the central body part.

A baffle plate 82 divides the water inlet passages 66, 67 in the forward ends of the vanes and the central body part from water flow passages in the rear parts of the vanes and the central body part. The water flowing back through the forward peripheral channels 75 extends through slots 83 in this baffle located between the inlet passages 66 so as to flow back into a central passage 84 in the rear body part 69. This passage is also divided into four separate flow channels by means of a central flow guide 85 to continue the four separate water flows through to the rear end of the central body. The rear peripheral flow channels 76 are also arranged in a set of four in similar fashion to the by-passages 75 at the front end of the central body so as to receive the four separate water flows at the rear end of the body and to take them back around the periphery of the body back to four circumferentially spaced outlet slots 86 in the casing through which the water flows into return passage 87 in the vanes.

The hollow vanes are divided internally by longitudinal baffles 89 so that the cooling water passages extend from the inner forward ends of the vanes back to the rear ends of the vanes then outwardly and forwardly along the outer longitudinal ends of the vanes to radially extending water outlet passages 91 in the forward ends 42 of the vanes which communicate through outlet slots 93 with the four circumferentially spaced return passages extending back through the duct wall to the common outlet 64 at the rear end of the duct. Baffle 82 divides the inlet and outlet passages 66, 91 within the vanes and the water inlet and outlet flow slots 65, 93 for each vane are formed in the forward end of the inner duct tube 35 at an angle to the longitudinal direction to suit the helix angle of the vanes as seen in FIG. 3.

The forward ends of the four concentric duct tubes 32, 33, 34, 35 are welded to three flanges 94, 95, 96 of the tip piece 55 so that they are firmly connected into a strong structure at the forward end of the lance. The rear ends of the duct tubes can move longitudinally with respect to one another to allow for differential thermal expansion during operation of the lance. As most clearly seen in FIG. 10, the rear end of duct tube 32 is provided with an outstanding flange 101 to which there is welded a continuous structure 102 which carries the various water inlets and outlets 57, 58, 62, 64. Structure 102 includes an internal annular flange 103 fitted with an O-ring seal 104 which serves as a sliding mounting for the rear end of duct tube 33, so allowing the duct tube 33 to expand and contract longitudinally independently of the outer duct tube 32. A structure 105 welded to the rear end of duct tube 34 includes annular flanges 106, 107 fitted with O-ring seals 108, 109 which provide a sliding mounting for the rear end of the duct tube 34 within the outer structure 102 fixed to the rear end of duct tube 32 so that duct tube 34 can also expand and contract independently of duct tube 32. The rear end of the inner most duct tube 35 is provided with an outstanding flange 111 fitted with an O-ring seal 112 which engages an annular ring 113 fitted to the outer structure 102 so as to also provide a sliding mounting for the innermost duct tube allowing for independent longitudinal expansion and contraction.

Provision is also made for thermal expansion of the flow guide vanes 39 and the inner body part 38. The vanes 39 are connected to the duct and to the inner body part only at their forward ends and in particular at the locations where there are water inlet and outlet flows at the inner and outer parts of the forward ends of the vanes. The main parts of the vanes simply fit between the refractory lining 43 of the duct and the casing of central body part 38 and are free to expand longitudinally. The water flow divider 85 within the rear section of the inner body part has a circular front end plate which slides within a machined surface of a tubular spigot 122 on baffle 82 so as to permit the forward and rear parts of the central body part to move apart under thermal expansion while maintaining sealing between the separated water flow passages. A thermal expansion joint 133 is provided to accommodate the thermal expansion between the forward and front ends of the central body part.

To further allow for thermal expansion, the vanes 39 may be shaped so as they do not extend radially outwardly between the casing of the central body part and the refractory lining of the duct when viewed in cross-section but such that they are slightly offset at an angle to the truly radial direction when the lance tubes and central body are in a cold condition. Subsequent expansion of the duct tubes during operation of the lance will allow the vanes to be drawn toward truly radial positions while maintaining proper contact with the duct lining and central body part while avoiding radial stresses on the vanes due to thermal expansion.

In operation of the illustrated hot air injection lance, independent cooling water flows are delivered to the four swirl vanes 39 so there can be no loss of cooling efficiency due to differential flow effects. The independent cooling water flows are also provided to the forward and rear ends of the central body part 38 so as to eliminate hot spots due to lack of water flow because of possible preferential flow effects. This is particularly critical for cooling of the forward end 72 of the central body part which is exposed to extremely high temperature conditions within the smelting vessel.

The duct tubes can expand and contract independently in the longitudinal direction under thermal expansion and contraction effects and the vanes and central body parts are also able to expand and contract without impairing the structural integrity of the lance or maintenance of the various independent flows of cooling water.

The illustrated lance 26 has proved capable of operating under extreme temperature conditions within a direct smelting vessel in which molten iron is produced by the HIsmelt process. Typically the cooling water flow rate through the four swirl vanes and the central body part will be of the order of 90 m$^3$/Hr and the flow rate through the outer housing and the lance tip will be of the order of 400 m$^3$/Hr. The total flow rate may therefore be of the order of 490 m$^3$/Hr at a maximum operating pressure of the order of 1500 kPag.

It is to be understood that the invention is in no way limited to the details of the described process and the illustrated construction and that many modifications and variations will fall within the spirit and scope of the invention.

What is claimed is:

1. A direct smelting process for producing ferrous metal from a ferrous feed material which includes the steps of:
   (a) forming a bath of molten metal and molten slag in a metallurgical vessel;
   (b) injecting ferrous feed material into the molten bath and smelting the ferrous feed material to metal in the molten bath;
   (c) injecting solid carbonaceous material into the molten bath;
   (d) generating a gas flow in the molten bath at least in part b reactions of injected material in the bath which carries molten material upwardly above a quiescent surface of the molten bath to form a raised bath; and
   (e) injecting pre-heated air into the vessel such that it impinges on or penetrates the raised bath and post-combusts reaction gases release from or contained within the raised bath, and thereby facilitating heat transfer to the molten bath;
which process is characterised by injecting pre-heated air downwardly into the vessel at an angle of 20 to 90° C. relative to a horizontal axis and at a temperature of 800–1400° C. and at a velocity of 200–600 m/s via at least one lance an forcing molten material in the raised bath in the region of a lower end of the lance away from the lance and forming a "free"space around the lower end of the lance that has a concentration of molten material that is lower than the molten material concentration in the raised bath, the lance being located so that: (i) the lance ex ends into the vessel a distance that is at least the outer diameter of the lower end of the lance; and (ii) the lower end of the lance is at least 3 times the outer diameter of the lower end of the lance above the quiescent surface of the molten bath.

2. The process defined in claim 1 wherein the concentration of molten material in the free space around the lower end of the lance is 5% or less by volume of the space.

3. The process defined in claim 1 wherein the free space around the lower end of the lance is a semi-spherical volume that as a diameter that is at least two times the outer diameter of the lower end of the lance.

4. The process defined in claim 3 wherein the diameter of the free space around the lower end of the lance is no more than four times the outer diameter of the lower end of the lance.

5. The process defined in claim 1 wherein at least 50% by volume of the oxygen in the pre-heated air is combusted in the free space around the lower end of the lance.

6. The process defined in claim 1 including injecting pre-heated air into the vessel in a swirling motion.

7. The process defined in claim 1 wherein the superficial gas flow in the molten bath is at least 0.04 $Nm^3/s/m^2$ of the quiescent surface of the molten bath.

8. The process defined in claim 7 wherein the superficial gas flow rate is at least 0.2 $Nm^2/s/m^2$ of the quiescent surface of the molten bath.

9. The process defined in claim 7 wherein the superficial gas flow rate is less than 2 $Nm^3/s/m^2$ of the quiescent surface of the molten bath.

10. The process defined in claim 1, including generating the gas flow from the molten bath by injecting ferrous material and solid carbonaceous material into the molten bath.

11. The process defined in claim 10 including generating the gas flow from the molten bath by injecting ferrous material and solid carbonaceous material to penetrate a lower region of the molten bath.

12. The process defined in claim 1, including injecting ferrous material and solid carbonaceous material into the molten bath via lances/tuyeres extending downwardly into the molten bath.

13. The process defined in claim 12 including injecting ferrous material and solid carbonaceous material into the molten bath via lances/tuyeres that extend through side walls of the vessel and are angled inwardly and downwardly within the molten bath.

14. The process defined in claim 1, including post-combusting reaction gases released from or contained within the raised bath to a level of at least 40%.

15. The process defined in claim 1, including controlling the level of dissolved carbon in molten iron in the molten bath to be at least 3 wt % and maintaining the slag in a strongly reducing condition leading to FeO levels of less than 6 wt % in the slag.

16. An apparatus for producing ferrous metal from a ferrous feed material by a direct smelting process, which apparatus includes a vessel to contain a molten bath of molten metal and molten slag and a gas continuous space above the molten bath, which vessel includes:
   (a) a hearth formed of refractory material having a base and sides to be in contact with a lower region of the molten bath;
   (b) side walls extending upwardly from the sides of the heart to be in contact with an upper region of the molten bath and the gas continuous space, wherein the side walls that contact the gas continuous space include water cooled panels to cause a layer of slag to form on the panels;
   (c) means for supplying ferrous feed material and carbonaceous material into the vessel;
   (d) means for generating a gas flow in the molten bath to carry molten material upwardly above a nominal quiescent surface of the molten bath and form a raised bath;
   (e) at least one lance extending downwardly into the vessel inject pre-heated air into the vessel at an angle of 20 to 90° relative to a horizontal axis at a velocity of 200–600 m/s and at a temperature of 800–1400° C., the lance being located so that:
      (i) the lance extends into the vessel a distance that is at least the outer diameter of a lower end of the lance; and
      (ii) the lower end of the lance is at least 3 times the outer diameter of the lower end of the lance above a quiescent surface oft e molten bath; the air to impinge on or to penetrate the raised bath and post-combusting reaction gases to be released from or contained within the raised bath, and the injection of air to force molten material in the raised bath in the region of the lower end of the lance away from the lower end so that there is a "free"space around the lower end of the lance that has a concentration of molten material lower than that in the raised bath; and
   (f) means for tapping molten metal and slag from the vessel.

17. The apparatus defined in claim 16 wherein the material supplying means and gas generating means include a plurality of lances/tuyeres to inject ferrous feed material and carbonaceous material with a carrier gas into the molten bath and generate the gas flow.

* * * * *